United States Patent
Wall (10) Patent No.: US 10,077,673 B2
(45) Date of Patent: Sep. 18, 2018

(54) METHOD AND APPARATUS FOR MONITORING THE OPERATION OF A POWER GENERATING INSTALLATION

(71) Applicant: Siemens Aktiengesellschaft, Munich (DE)

(72) Inventor: Dirk Wall, Mülheim (DE)

(73) Assignee: Siemens Aktiengesellschaft, Munich (DE)

( * ) Notice: Subject to any disclaimer, the term of this patent is extended or adjusted under 35 U.S.C. 154(b) by 14 days.

(21) Appl. No.: 15/546,473

(22) PCT Filed: Dec. 16, 2015

(86) PCT No.: PCT/EP2015/079982
§ 371 (c)(1),
(2) Date: Jul. 26, 2017

(87) PCT Pub. No.: WO2016/124286
PCT Pub. Date: Aug. 11, 2016

(65) Prior Publication Data
US 2018/0030847 A1    Feb. 1, 2018

(30) Foreign Application Priority Data
Feb. 3, 2015   (DE) .......... 10 2015 201 836

(51) Int. Cl.
*F01D 17/06* (2006.01)
*F01D 21/02* (2006.01)
(Continued)

(52) U.S. Cl.
CPC .......... *F01D 17/06* (2013.01); *F01D 21/02* (2013.01); *F01K 13/02* (2013.01); *H02J 3/40* (2013.01); *H02P 9/02* (2013.01); *H02P 9/10* (2013.01)

(58) Field of Classification Search
CPC .................. F01D 17/06; H02P 9/02
(Continued)

(56) References Cited

U.S. PATENT DOCUMENTS

| 6,914,408 B2 * | 7/2005 | Sawada .............. B60L 11/1803 318/721 |
| 7,268,443 B2 | 9/2007 | Kikuchi et al. |

(Continued)

FOREIGN PATENT DOCUMENTS

| DE | 10328932 A1 | 1/2005 |
| DE | 102005034635 A1 | 2/2006 |

(Continued)

OTHER PUBLICATIONS

DE Search Report dated Sep. 29, 2015, for DE patent application No. 102015201836.9.

(Continued)

*Primary Examiner* — David S Luo
(74) *Attorney, Agent, or Firm* — Beusse Wolter Sanks & Maire (57) ABSTRACT

A method for monitoring operation of a power generating installation that has at least one generator that is driven by a rotating machine, in which values of an operating parameter of the generator and/or rotating machine are captured and stored, it is ascertained whether the value of the operating parameter at prescribed checking times lies outside an admissible range, wherein a possible fault is inferred if the value of the operating parameter lies outside the admissible range at two directly successive checking times, an additional check is performed to determine whether the value of the operating parameter is approaching the admissible range in a prescribed checking interval that lies between two directly successive checking times and particularly extends as far as the later of the two checking times, and it is inferred (Continued)

that there is a fault if the value of the operating parameter is not approaching the admissible range.

25 Claims, 2 Drawing Sheets

(51) Int. Cl.
*H02P 9/02* (2006.01)
*H02P 9/10* (2006.01)
*H02J 3/40* (2006.01)
*F01K 13/02* (2006.01)

(58) Field of Classification Search
USPC .................................................. 318/490, 34

See application file for complete search history.

(56) References Cited

U.S. PATENT DOCUMENTS

| 7,450,355 B2 * | 11/2008 | Ochiai ................... H02H 3/05 |
| | | 318/430 |
| 7,615,880 B2 | 11/2009 | Kikuchi et al. |
| 7,952,216 B2 | 5/2011 | Kikuchi et al. |
| 8,242,620 B2 | 8/2012 | Kikuchi et al. |
| 8,466,573 B2 | 6/2013 | Kikuchi et al. |

FOREIGN PATENT DOCUMENTS

| EP | 0483570 A1 | 5/1992 |
| EP | 1492222 A2 | 12/2004 |
| EP | 2423464 A1 | 2/2012 |

OTHER PUBLICATIONS

International Search Report dated Apr. 8, 2016, for PCT/EP2015/079982.

* cited by examiner

METHOD AND APPARATUS FOR MONITORING THE OPERATION OF A POWER GENERATING INSTALLATION

CROSS REFERENCE TO RELATED APPLICATIONS

This application is the US National Stage of International Application No. PCT/EP2015/079982 filed Dec. 16, 2015, and claims the benefit thereof. The International Application claims the benefit of German Application No. DE 102015201836.9 filed Feb. 3, 2015. All of the applications are incorporated by reference herein in their entirety.

FIELD OF INVENTION

The invention relates to a method for monitoring the operation of an electricity generating installation, which comprises at least one generator that is driven by a rotating machine in order to supply electricity to an electric grid, in which—values of an operating parameter of the generator and/or of the rotating machine are acquired and stored,—it is ascertained whether the value of the operating parameter at prescribed checking instants lies outside an admissible range.

The invention additionally relates to an apparatus for monitoring the operation of an electricity generating installation, which comprises at least one generator that is driven by a rotating machine in order to supply electricity to an electric grid, comprising—acquisition means that are designed to acquire the value of an operating parameter of the generator and/or of the rotating machine, and—an evaluation device that is designed to receive and store values of the operating parameter that are transferred by the acquisition means, and to ascertain whether the value of the operating parameter at prescribed checking instants lies inside or outside an admissible range.

BACKGROUND OF INVENTION

Electricity generating installations, by means of which mechanical energy can be converted to electrical energy for the purpose of providing electricity, are known from the prior art. For the conversion of energy, such installations comprise at least one generator that is driven by one or more rotating machines, for example an internal combustion motor or a gas turbine, for the purpose of generating electricity. The electrical energy provided by the electricity generating installation is fed into an electric consumer grid that is connected to the installation. The feeding-in in this case is effected according to demand, i.e. in normal operation, the electric power provided by the electricity generating installation corresponds to the load demanded by the electric grid. In this case, the rotational machine driving the generator rotates substantially at a constant rotation speed.

If there is a sudden pronounced change in the consumer-side demanded load, it is normally necessary for the operation of the electricity generating installation to be adjusted by appropriate control measures. If, for example, the consumer-side load suddenly collapses, because large consumers or entire parts of the electric grid are switched off, the supplied mechanical energy can no longer be converted to electrical energy to the same extent, and consequently all rotating components of the electricity generating installation begin to accelerate, because of their inherent moments of inertia. Such a sudden collapse of the consumer-side load is also referred to as load shedding.

In order to monitor the operation of the electricity generating installation, one or more operating parameters of the generator and/or of the rotating machine is or are acquired, and checked continuously, or at prescribed intervals, as to whether they lie inside or outside an admissible range. If, for example, the rotational speed of one or more of the rotating components of the installation exceeds an admissible maximum value, counter-measures have to be taken for safety reasons. For example, the supplied energy, in the form of the fuel supply to a gas turbine, may be restricted. In extreme cases, the rotating components have to be switched off completely.

As a counter-measure, a complete switch-off of components of the electricity generating installation, in particular, involves a considerable resource demand. Following a complete switch-off, the electricity generating installation must be restarted, powered-up and synchronized to the frequency of the electric grid to be supplied.

In this case, there is the problem that the counter-measures are in part also initiated in operating situations in which there are only temporary collapses of power, which, over a certain period of time, can be accepted or claimed against, without counter-measures. If such power fluctuations are erroneously identified as load shedding and corresponding counter-measures are initiated, a considerable resource demand is caused needlessly.

In light of this, the efforts in the prior art are toward improving the known methods for monitoring the operation of an electricity generating installation.

DE 103 28 932 A1, discloses a method in which the alternation frequency of the voltage provided by means of the generator of an electricity generating installation is acquired as an operating parameter and compared with an admissible maximum value. The alternation frequency of the voltage is directly proportional to the rotation speed of the generator. In addition to the alternation frequency, a second operating quantity is acquired, which depends on the moment of inertia of the rotational machine. This may be the time change of the alternation frequency. Only if the two operating quantities lie outside a respectively admissible maximum value is it inferred that there is load shedding, and corresponding counter-measures are initiated. The disclosed method accordingly seeks, in the case of a sudden grid load collapse, to take into consideration, besides the rotation speed of the generator, also its acceleration, and to use this as a further indication of the existence of load shedding. Since, if there is actually load shedding, a characteristic acceleration value ensues, this parameter can serve as an additional evaluation criterion.

The known methods have basically proved effective for monitoring the operation of electricity generating installations and identifying load sheddings. However, there is a requirement for further, improved methods that enable differing operating states and malfunctions to be distinguished in a particularly reliable manner.

SUMMARY OF INVENTION

Proceeding from the aforementioned prior art, it is therefore an object of the present invention to specify a method for monitoring the operation of an electricity generating installation, by means of which load sheddings can be identified in a particularly reliable manner and distinguished from other operating states or malfunctions. In addition, it is an object of the present invention to specify an apparatus by means of which such a method can be executed.

In the case of a method of the type stated at the outset, this object is achieved in that—a possible fault is inferred if the value of the operating parameter lies outside the admissible range at two directly successive checking instants, and it is additionally checked whether the value of the operating parameter is approaching the admissible range in a prescribed checking interval that lies between the two directly successive checking instants and, in particular, extends up to the later of the two checking instants, and—it is inferred that there is a fault if the value of the operating parameter is not approaching the admissible range.

During the operation of the electricity generating installation, for the purpose of monitoring the latter, within the method according to the invention at least one operating parameter of the generator, or of the rotating machine, is acquired and compared at prescribed checking instants with a prescribed limit value. It is inferred that there is a possible fault, i.e. a deviation from the normal operation of the installation, if the value of the monitoring operating parameter(s) does not fulfill the prescribed limit value criterion at two directly successive checking instants.

In other words, the basic concept of the present invention then consists in that, in such a case, it is additionally checked how the operating parameter before the second of these two directly successive checking instants behaved. Specifically, it is checked whether the operating parameter is already back in a recovery state, i.e. is already again approaching the admissible range, in a checking interval that lies between these two checking instants at which the non-fulfillment of the limit value was registered twice in succession. For this, the gradient of the operating parameter, at one or more instants in the checking interval, can be considered. For the additional checking according to the invention, as to whether the admissible range is being approached, already acquired and stored values of the operating parameter can be used in this case.

If the result of the additional checking is that a recovery of the operating parameter is not occurring in the checking interval under consideration, i.e. it is not already again approaching the admissible range, it is inferred that there is a fault, in particular load shedding.

If, on the other hand, the result of the additional checking according to the invention is that there is a recovery of the monitored operating parameter in the checking interval under consideration, it can be inferred that the operating parameter will shift back into the admissible range within a foreseeable period of time. In such a case, it is not inferred that there is load shedding. In such a case, the fault identification, in particular the load shedding identification, can be reset, and counter-measures are not initiated. Clearly, it is possible for further checking steps to be performed in such a case, in order to analyze the operating state with greater precision.

The additional checking according to the invention makes it possible to distinguish in a particularly reliable manner between load sheddings and other operating states, deviating from normal operation, in which there occur power fluctuations that last longer than the respective time span between two checking instants. It has been found in this case that the method according to the invention achieves the effect, in particular, that the power fluctuations that occur in the course of elimination of a short circuit are not erroneously identified as load shedding. This is because, precisely in the elimination of a short circuit, it may happen that, for example, the power and/or rotation speed of the generator is or are outside the admissible range at two directly successive checking instants, but that the operating parameter is already recovering again in a time interval that precedes the second of the two checking instants. This is identified by use of the method according to the invention, and in such a case the initiation of unnecessary counter-measures can be reliably prevented.

As a result, particularly reliable and efficient operation of an electricity generating installation is rendered possible.

In an expedient design, the past time period that, according to the invention, is considered as a checking interval extends up to shortly before, or up to, the second of the two checking instants at which the non-fulfillment of the limit value criterion was registered. Thus, the behavior of the operating parameter in a range lying just before the second of the two checking instants can be considered for the additional checking.

Further, expediently, between respectively two of the checking instants considered within the method according to the invention, there is a maximum time span, prescribed for safety reasons or grid requirements, which may be, for example, some hundreds of milliseconds.

Thus, according to an embodiment of the method according to the invention, it is provided that checking instants are considered, between each of which there is a time interval in the range of from 100 to 500 milliseconds, in particular from 100 to 350 milliseconds, advantageously from 200 to 300 milliseconds.

For example, it may be prescribed by grid requirements that compliance with a limit value criterion be checked, with respect to an operating parameter, every few hundred milliseconds. To adhere to such a prescription it is then possible, within the method according to the invention, to consider, for example, checking instants that are correspondingly separated with respect to time.

The acquisition of the operating parameter is expediently effected with a, in particular, significantly higher resolution than the comparison of the acquired values with the limit value at the checking instants. The acquisition of the value of the operating parameter may be effected, for example, continuously or at prescribed acquisition instants, which are closer together in time than the checking instants. The resolution of the acquisition may be selected, for example, in such a manner that there are respectively several tens, or even several hundreds, of acquisition instants between two checking instants.

According to a further embodiment of the method, a checking interval is considered whose length corresponds maximally to half, in particular maximally to a quarter, advantageously maximally to a tenth, and particularly advantageously maximally to a twentieth, of that time interval that is defined by the two directly successive checking instants at which the value of the operating parameter lies outside the admissible range.

For example, a checking interval ($\Delta t_p$) may be considered, having a length in the range of from 5 to 50 milliseconds, in particular 5 to 30 milliseconds, advantageously 5 to 15 milliseconds. These values have proved to be suitable.

Whether the operating parameter is approaching the admissible range in the checking interval, can be ascertained according to the invention, for example, in that the value of the operating parameter at the second of the two checking instants is compared with the value of the operating parameter at an instant, within the checking interval, at which a measurement value was acquired. The value of the operating parameter acquired at a plurality of acquisition instants within the checking interval may also be considered in order to ascertain whether the operating parameter is or is not again approaching the admissible range.

A further embodiment of the method according to the invention is additionally distinguished in that the difference between the value of the operating parameter at the later of the two checking instants at which the value of the operating parameter lies outside the admissible range and the value of the operating parameter at an additional checking instant, which lies inside the checking interval, is ascertained, and it is inferred from the sign of the difference whether the value of the operating parameter is or is not approaching the admissible range in the checking interval.

Depending on whether the admissible range is above or below the inadmissible range, i.e. depending on whether an upper or lower limit value is to be considered, the presence of an approach, or the presence of no approach, is inferred from a positive sign. If the difference of the power values that was acquired at the later of the two checking instants and at the additional checking instant lying before the latter has a positive sign, it is inferred therefrom that the admissible range that is delimited by a lower power limit value is being approached. In the case of the rotational speed, it would be precisely the opposite, since the admissible rotational speed range is below the inadmissible rotational speed range.

In particular, it may be provided in this case that an additional checking instant is considered that lies 5 to 50 milliseconds, in particular 5 to 30 milliseconds, advantageously 5 to 15 milliseconds, before the later of the two directly successive checking instants at which the value of the operating parameter lies outside the admissible range.

In development of the method according to the invention, it may additionally be provided that the amount of the difference between the value of the operating parameter at the later of the two checking instants at which the value of the operating parameter lies outside the admissible range and the value of the operating parameter at an additional checking instant, which lies inside the checking interval, is ascertained, and the amount of the difference is compared with a prescribed maximum value, wherein the presence of a fault is inferred if the amount exceeds the maximum value.

This design makes it possible also to consider, in addition to the sign of the difference, how far apart are the values of the operating parameter at the later of the two instants and at the additional checking instant. If the disparity is too great, it may be necessary to initiate counter-measures, for which reason the amount of the difference is compared with a maximum value and, if it exceeds the latter, a fault is inferred.

The difference is obtained by using, from the stored operating parameter values, that which was acquired at the additional checking instant and that which was acquired at the second of the two checking instants, and the difference is obtained. The additional checking instant in this case may be, for example, directly at the start of the considered checking interval. If, for example, there is considered according to the invention a checking interval having a length of 20 milliseconds that extends directly up to the later of the two checking instants at which the non-fulfillment of the limit value was registered, the additional checking instant is thus 20 milliseconds before the later of the two checking instants.

Furthermore, a rate of change of the operating parameter in the predefined checking instant may be determined. It can be inferred, from the sign of the rate of change of the operating parameter, whether the value of the operating parameter is or is not approaching the admissible range in the checking interval.

According to this embodiment, the sign of the slope of the operating parameter is determined at at least one instant lying in the checking interval, and it is inferred from the sign whether the operating parameter is or is not again approaching the admissible range.

Finally, it can be ascertained whether the value of the rate of change lies inside or outside an admissible range, and a fault can be inferred if the value of the rate of change lies outside the admissible range.

If the value of the operating parameter is again approaching the admissible range, but this is occurring only very slowly, it may be appropriate to adjust the operation of the electricity generating installation. Therefore, according to this embodiment, the presence of a fault is inferred if the rate of change of the operating parameter lies outside an admissible range, in particular if it is below a prescribed minimum value.

The invention additionally provides that the difference between the value of the operating parameter at the later of the two directly successive checking instants at which the value of the operating parameter lies outside the admissible range and an operating-parameter reference value is ascertained, and a fault is inferred if the amount of the difference exceeds a prescribed value. Additionally ascertained according to this embodiment is the magnitude of the disparity of the value of the operating parameter that is acquired at the later of the two checking instants in relation an operating-parameter reference value. If the disparity is greater than a prescribed maximum value, it may be appropriate or necessary to adjust the operation of the electricity generating installation.

Within the execution of the method according to the invention, the power of the generator and/or the rotational speed of the generator, for example, may be acquired metrologically and stored as an operating parameter of the generator, and/or the torque of the rotating machine may be acquired and stored as an operating parameter of the rotating machine. Alternatively or additionally, other operating parameters may be acquired.

The operating parameters in this case can each be directly acquired metrologically by appropriate means, or a quantity, from which the operating parameter to be considered can be ascertained, can be acquired metrologically. For example, the rotational speed of the generator can be directly acquired metrologically by means of appropriate sensors, or the alternation frequency of the alternating voltage generated by the generator, which is directly proportional to the rotation speed of the generator, is measured. The power of the generator can be acquired, for example, in that the voltage and the current of the generator are detected metrologically and multiplied by each other.

In principle, it is possible that, within the method according to the invention, only one operating parameter of the generator or of the rotating machine is acquired, stored and used for the monitoring according to the invention. Alternatively, a plurality of operating parameters of the generator and/or of the rotating machine may also be acquired. For example, both the rotational speed and the power of the generator may be measured directly, or derived from a directly measured quantity. The acquisition of the operating parameter refers both to a direct measurement of the parameter itself and to the direct measurement of another value, from which the operating parameter to be considered is then derived.

If a plurality of operating parameters, in particular of the generator and/or rotating machine are acquired, the additional checking according to the invention, as to whether the operating parameter is or is not approaching the admissible range in the prescribed checking interval may be performed for only one of the operating parameters, for a plurality of the latter or, also, for all.

It is thus possible for the power and the rotational speed of the generator to be acquired and both parameters compared, at the prescribed checking instants, with corresponding limit values, in order to ascertain whether these parameters lie inside or outside the respectively admissible range. If the limit value criterion is not fulfilled at two directly successive checking instants by two parameters, i.e. the latter do not lie in the admissible range, the additional checking according to the invention, as to whether the admissible range is being approached in the prescribed checking interval, may be performed for only one of the two parameters or, also, for both.

The rotating machine that drives the generator is, for example, a gas turbine.

In an advantageous design, if a plurality of generators, which are each driven by one or more rotating machines, are operated in an electricity generating installation, then, within the execution of the method according to the invention, operating parameters of each generator and/or of each rotating machine are acquired and evaluated.

The aforementioned object is additionally achieved, in the case of an apparatus of the type stated at the outset, in that the evaluation device is realized in such a manner that, by means of the latter—a possible fault is inferred if the value of the operating parameter lies outside the admissible range at two directly successive checking instants, and it may additionally be checked whether the value of the operating parameter is approaching the admissible range in a prescribed checking interval that lies between the two directly successive checking instants and that, in particular, extends up to the later of the two checking instants, and—it is inferred that there is a fault if the value of the operating parameter is not approaching the admissible range.

An apparatus having an evaluation device designed in this manner is suitable for executing the method according to the invention for monitoring the operation of an electricity generating installation.

The apparatus according to the invention may be realized, for example, as an integral constituent part of a central control means of the electricity generating installation.

According to an embodiment, the acquisition means are realized in such a manner that, by means thereof, the operating parameter or parameters to be considered are detected metrologically, or at least a quantity, from which the operating parameter or parameters to be considered can be derived, can be detected metrologically.

BRIEF DESCRIPTION OF THE DRAWINGS

Further features and advantages of the present invention are disclosed by the following description of an embodiment of the method according to the invention and of the apparatus according to the invention, with reference to the accompanying drawing, in which.

DETAILED DESCRIPTION OF INVENTION

Figure 1:
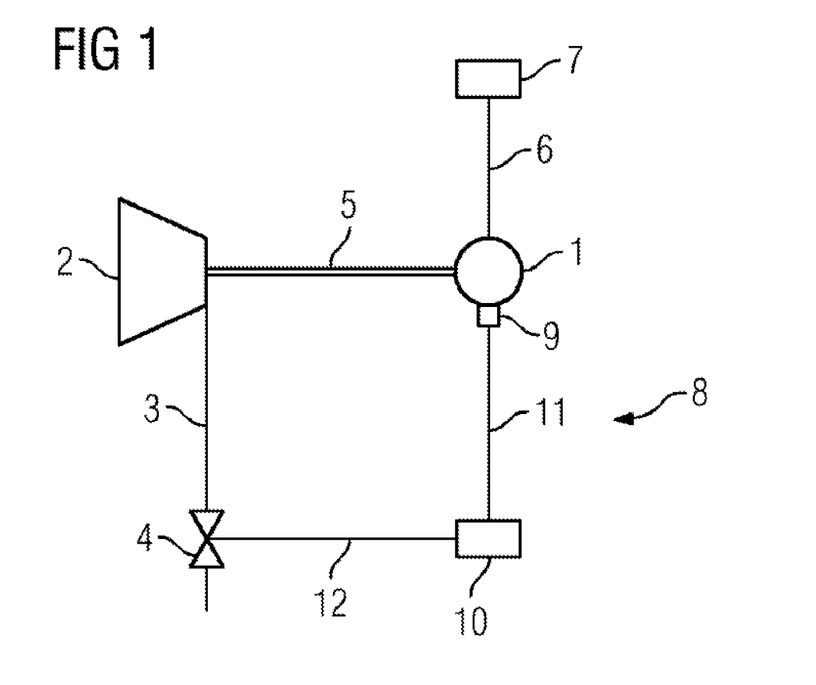
FIG. 1 shows, in a purely schematic representation, a generator and a gas turbine of an electricity generating installation having an apparatus for monitoring the operation of the electricity generating installation, according to an exemplary embodiment of the invention.

FIG. 1 shows, in a purely schematic representation, a block diagram with some components of an electricity generating installation. Specifically, represented in the block diagram in FIG. 1 are a generator 1 and a gas turbine 2 of the electricity generating installation. The further components of the electricity generating installation are not shown in FIG. 1.

When the installation is in operation, fuel is supplied to the gas turbine 2 via a gas supply line 3, in which a controllable valve 4 is provided. The gas turbine 2 is thereby made to rotate and drives the generator 1, which is connected to the gas turbine 2 via a common shaft 5, for the purpose of generating electricity. Via an electric line 6, the generator 1 is connected to an electric grid 7, into which the electricity generated by the generator 7 is fed.

Additionally provided is an apparatus 8 for monitoring the operation of the electricity generating installation.

The apparatus 8 has acquisition means 9, by means of which the rotational speed and the power of the generator 1 are acquired, as operating parameters, when the electricity generating installation is in operation. Specifically, the rotational speed of the generator 1 is acquired in that it is directly detected metrologically by means of an appropriate sensor, not represented in FIG. 1, of the acquisition means 9. The power of the generator 1 is acquired in that the current and the voltage of the generator 1 are detected metrologically by appropriate measuring devices (not represented) of the acquisition means 9, and the power of the generator 1 is determined from the current and the voltage, by multiplication of these quantities.

The apparatus 8 additionally has an evaluation device 10, which is connected to the acquisition means 9 via a line 11, and to the controllable valve 4 via a further line 12.

The evaluation device 10 is designed to receive and store values of the operating parameters, i.e. of the power and the rotational speed of the generator 1, that are transferred by the acquisition means 9, and to ascertain whether the values of the operating parameters at prescribed checking instants lie inside or outside an admissible range. For this purpose, a maximally admissible rotational-speed limit value $n_{limit}$ and a minimally admissible power limit value $P_{limit}$ are stored in the evaluation device 10. The rotational speed is in the admissible range if it is below the rotational-speed limit value $n_{limit}$, and the power is in the admissible range if it is above the power limit value $P_{limit}$. In order that it can be ascertained whether or not the power and the rotational speed lie in the admissible range, the evaluation device 10 is designed to perform a comparison of the acquired power values and rotational speed values with the limit values.

If the power and the rotational speed of the generator 1 lie outside the admissible range at two successive checking instants, the evaluation device 10 can ascertain whether, in a checking interval lying before the later of the two checking instants, the power and the rotational speed are approaching the admissible range.

In addition, a rotational-speed reference value $n_{ref}$ and a power reference value $P_{ref}$ are stored in the evaluation device 10, and the evaluation device can ascertain whether the amount of the difference between the value of the power, or of the rotational speed, that was acquired at the later of the two checking instants, and the power reference value, or rotational-speed reference value, exceeds a prescribed value.

Finally, the evaluation device 10 is designed in such a manner that, via the line 12, it can output an appropriate control signal to the controllable valve 4, in order to restrict the supply of fuel to the gas turbine 2 if the operating parameters are not approaching the admissible range and if the amount of the difference of the operating values in relation to the respective reference value exceeds the prescribed maximum.

When the electricity generating installation is in operation, for the purpose of monitoring the latter an advantageous embodiment of the method according to the invention is performed.

For this purpose, the rotational speed, the current and the voltage are detected metrologically by means of the acquisition means 9 of the apparatus 8, at prescribed acquisition instants, which are each 5 milliseconds apart. The power is determined from the current and the voltage, such that, for each acquisition instant, i.e. every 5 milliseconds, the present value of the rotational speed and the present value of the power are available.

The power values and rotational speed values, after having been acquired, are transferred to the evaluation device 10 and stored therein.

Figure 2:
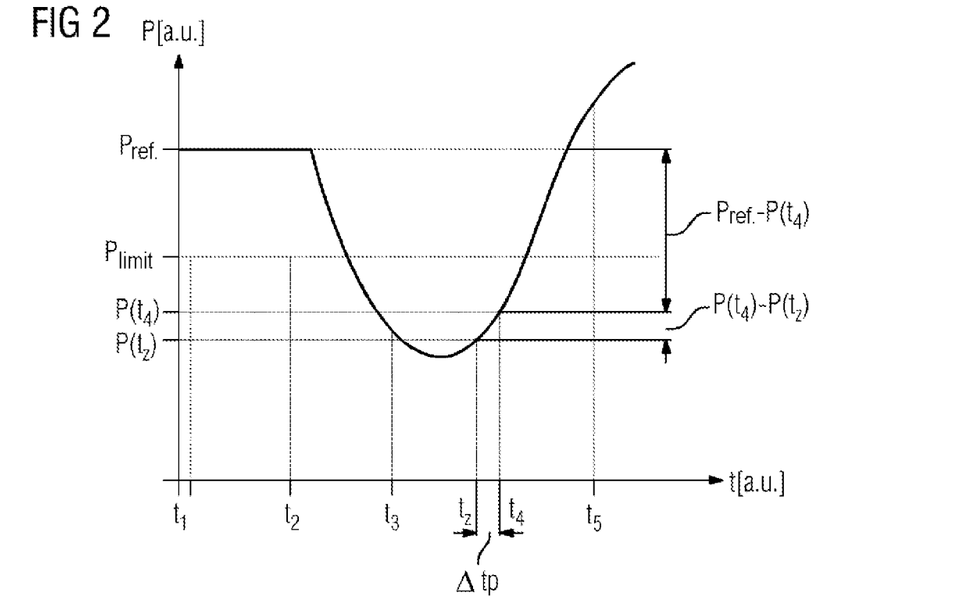
FIG. 2 shows a graph in which the power of the generator from FIG. 1 is plotted over time.
Figure 3:
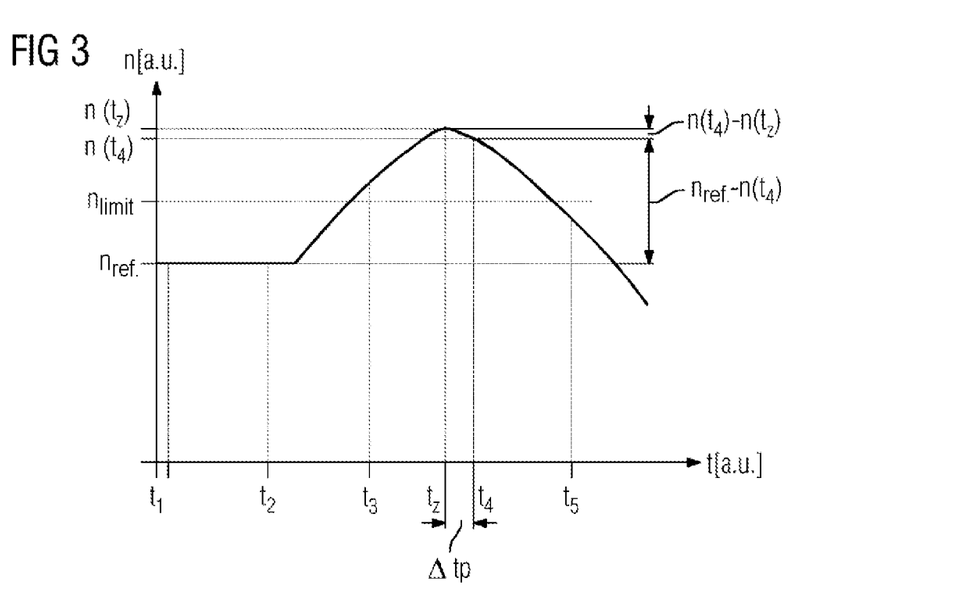
FIG. 3 shows a graph in which the rotational speed of the generator from FIG. 1 is plotted over time.

In FIGS. 2 and 3, the acquired power values and the acquired rotational speed values for a prescribed time period are represented in a graph. The two axes in the graphs are dimensionless.

In FIG. 2, the power limit value $P_{limit}$ and the power reference value $P_{ref}$ are plotted. In the same way, the graph in FIG. 3 gives the rotational-speed limit value $n_{limit}$ and the rotational-speed reference value $n_{ref}$.

By means of the evaluation device 10, it is ascertained whether the power values and rotational speed values at prescribed checking instants $t_1$ to $t_5$, which are each 250 milliseconds apart, lie outside the respectively admissible range. For this purpose, the rotational speed values and the power values that were acquired at the prescribed checking instants $t_1$ to $t_5$ are compared with the respective limit value.

As shown by FIGS. 2 and 3, at the two checking instants $t_1$ and $t_2$ the power and the rotational speed of the generator 1 lie in the admissible range, i.e. at these two checking instants the power lies above the lower power limit value $P_{limit}$, and the rotational speed lies below the upper rotational-speed limit value $n_{limit}$.

At the next checking instant $t_3$ and the next but one checking instant $t_4$, on the other hand, the power and the rotational speed lie outside the respectively admissible range. In the present case, this is caused by the fact that a short circuit has occurred, which can be eliminated, associated with which is the fluctuation of power and rotational speed that can be seen in the two figures.

Since the limit value criterion for power and the rotational speed of the generator 1 is not fulfilled at the two directly successive checking instants $t_3$ and $t_4$, it is inferred therefrom that there is a possible fault. Within the method according to the invention it is then additionally checked, by means of the evaluation device 10, how the power and the rotational speed of the generator 1 behaved in a prescribed checking interval $\Delta t_p$ that lies between the two checking instants $t_3$ and $t_4$ and that extends up to the later of the two checking instants, i.e. up to the checking instant $t_4$. Specifically, it is checked whether, in the prescribed checking interval $\Delta t_p$, the value of the power and the value of the rotational speed are or are not again approaching the admissible range.

In the case of the exemplary embodiment represented, a checking interval $\Delta t_p$, having a length of 10 milliseconds, is considered. Accordingly, the length of the checking interval $\Delta t_p$ corresponds to one twenty-fifth of the length of the interval, of 250 milliseconds, lying between the two checking instants.

In the present case it is determined whether, in the checking interval $\Delta t_p$, the power of the generator 1 is approaching the admissible range, by ascertainment of the difference between the value of the power at the later of the two checking instants at which the value of the power lies outside the admissible range, i.e. the checking instant $t_4$, and the value of the power at an additional checking instant $t_z$ lying inside the checking interval $\Delta t_p$, i.e. $P(t_4)-P(t_z)$. The additional checking instant $t_z$ lies at the start of the checking interval $\Delta t_p$. The additional checking instant $t_z$ thus lies 10 milliseconds before the checking instant $t_4$.

The sign of this difference is positive, from which it is inferred that the admissible power range is being approached.

In the case of the rotational speed values plotted in the graph of FIG. 3, the situation is precisely the reverse, as far as the sign is concerned. Here, the difference is obtained between the value of the rotational speed acquired at the checking instant $t_4$ and of the rotational speed acquired at the additional checking instant $t_z$, i.e. $n(t_4)-n(t_z)$, and this difference has a negative sign. In the same way as in the case of the power, it is inferred therefrom that the admissible rotational-speed range, which extends below the inadmissible range, is being approached.

In addition, the amount of the difference between the value of the power of the generator 1 at the later of the two checking instants $t_4$ and the value of the power at the additional checking instant $t_z$ is determined, i.e. the amount of the difference $P(t_4)-P(t_z)$. The amount of this power difference is compared with a maximum admissible differential power value that is stored in the evaluation means 10. In the present case, the amount of the difference does not exceed the prescribed maximally admissible differential power value. According to the invention, it is inferred therefrom that there is no fault.

In the same way, the amount of the difference is obtained between the value of the rotational speed acquired at the checking instant $t_4$ and of the rotational speed acquired at the additional checking instant $t_z$. i.e. the amount of the difference $n(t_4)-n(t_z)$. The amount of this difference is compared with a prescribed maximum rotational-speed differential value that, likewise, is stored in the evaluation device 10. In the present case, the result of the comparison is that the amount of the rotational speed difference lies below the maximally admissible value. According to the invention, it is inferred therefrom that there is no fault.

In the case of the exemplary embodiment represented, additionally ascertained, by means of the evaluation device 10 of the apparatus 8, are the difference between the value of the power at the checking instant $t_4$ and the power reference value $P_{ref}$, i.e. $P(t_4)-P_{ref}$, and the difference between the value of the rotational speed at the checking instant $t_4$ and the rotational-speed reference value $n_{ref}$, i.e. $n(t_4)-n_{ref}$. The amount of the respective difference is compared with a prescribed maximum value respectively stored in the evaluation means 10. In the present case, the result of the two comparisons is that the prescribed value is not exceeded. It is inferred therefrom that there is no fault.

Since the result of the additional checking according to the invention, as to whether, in the checking interval $\Delta t_p$, the two considered operating parameters, power and rotational speed of the generator 1, are approaching the respectively admissible range, is that the approaching is occurring, and neither the amount of the difference of the power values acquired at the instant $t_4$ and at the additional checking instant $t_z$, nor the amount of the difference of the rotational speed values acquired at the instant $t_4$ and at the additional checking instant $t_z$, exceeds the respective maximum value, and also the difference of the values at the later checking instant $t_4$ is not too great in relation to the respective reference value, it is inferred therefrom, according to the invention, that there is no fault, specifically no load shedding.

Consequently, no counter-measures are taken. The supply of fuel to the gas turbine 2 is thus not restricted via the controllable valve 4.

The monitoring is continued in the manner previously described, both operating parameters again lying in the admissible range at the next checking instant $t_5$, as shown by FIGS. 2 and 3. Should the operating parameters subsequently again lie outside the admissible range at two directly successive checking instants, it is again additionally checked whether, in the checking interval $\Delta t_p$ before the later of the two checking instants, the operating parameters are again approaching the admissible range, and conclusions are drawn in the previously described manner and, if appropriate, counter-measures are taken.

As a result, use of the method according to the invention reliably prevents the temporary collapse of the power and the temporary rise in the rotational speed, which are shown in FIGS. 2 and 3, and which are caused by the elimination of a short circuit, from being erroneously identified as load shedding. A particularly efficient and reliable operation of the electricity generating installation can thus be ensured.

Although the invention has been illustrated and described in greater detail by means of the preferred exemplary embodiment, the invention is not thus limited by the disclosed examples, and other variations may be inferred therefrom by persons skilled in the art, without departure from the protective scope of the invention.

The invention claimed is:

1. A method for monitoring and controlling the operation of an electricity generating installation, which comprises at least one generator that is driven by a rotating machine in order to supply electricity to an electric grid, the method comprising: acquiring and storing values of an operating parameter of the generator and/or of the rotating machine, ascertaining whether the value of the operating parameter at prescribed checking instants lies outside an admissible range, inferring a possible fault if the value of the operating parameter lies outside the admissible range at two directly successive checking instants, and additionally checking whether the value of the operating parameter is approaching the admissible range in a prescribed checking interval that lies between the two directly successive checking instants, and inferring that there is a fault if the value of the operating parameter is not approaching the admissible range, and sending a control signal to a controllable valve to restrict a supply of fuel to the rotating machine to control the operation of the electricity generating installations as a result of the fault being inferred.

2. The method as claimed in claim 1, wherein checking instants are considered, between each of which there is a time interval in the range of from 100 to 500 milliseconds.

3. The method as claimed in claim 2, wherein the time interval is in the range of from 100 to 350 milliseconds.

4. The method as claimed in claim 2, wherein the time interval is in the range of from 200 to 300 milliseconds.

5. The method as claimed in claim 1, wherein a checking interval is considered whose length corresponds maximally to half, of that time interval that is defined by the two directly successive checking instants at which the value of the operating parameter lies outside the admissible range.

6. The method as claimed in claim 5, wherein a checking interval is considered whose length corresponds maximally to a quarter of that time interval that is defined by the two directly successive checking instants at which the value of the operating parameter lies outside the admissible range.

7. The method as claimed in claim 5, wherein the checking interval is considered whose length corresponds maximally to a tenth of that time interval that is defined by the two directly successive checking instants at which the value of the operating parameter lies outside the admissible range.

8. The method as claimed in claim 5, wherein the checking interval is considered whose length corresponds maximally to a twentieth of that time interval that is defined by the two directly successive checking instants at which the value of the operating parameter lies outside the admissible range.

9. The method as claimed in claim 1, wherein the checking interval is considered, having a length in the range of from 5 to 50 milliseconds.

10. The method as claimed in claim 9, wherein a checking interval is considered, having a length in the range of from 5 to 30 milliseconds.

11. The method as claimed in claim 9, wherein the checking interval is considered, having a length in the range of from 5 to 15 milliseconds.

12. The method as claimed in claim 1, wherein the difference between the value of the operating parameter at the later of the two checking instants at which the value of the operating parameter lies outside the admissible range and the value of the operating parameter at an additional checking instant, which lies inside the checking interval, is ascertained, and it is inferred from the sign of the difference whether the value of the operating parameter is or is not approaching the admissible range in the checking interval.

13. The method as claimed in claim 12, wherein an additional checking instant is considered that lies 5 to 50 milliseconds, before the later of the two directly successive checking instants at which the value of the operating parameter lies outside the admissible range.

14. The method as claimed in claim 13, wherein the additional checking instant is considered that lies 5 to 30 milliseconds before the later of the two directly successive checking instants at which the value of the operating parameter lies outside the admissible range.

15. The method as claimed in claim 13, wherein the additional checking instant is considered that lies 5 to 15 milliseconds before the later of the two directly successive checking instants at which the value of the operating parameter lies outside the admissible range.

16. The method as claimed in claim 12, wherein the amount of the difference between the value of the operating parameter at the later of the two checking instants at which the value of the operating parameter lies outside the admissible range and the value of the operating parameter at the additional checking instant, which lies inside the checking interval, is ascertained, and the amount of the difference is compared with a prescribed maximum value, wherein the presence of a fault is inferred if the amount exceeds the maximum value.

17. The method as claimed in claim 1, wherein a rate of change of the operating parameter in the predefined checking interval is determined.

18. The method as claimed in claim 17, wherein it is inferred, from the sign of the rate of change of the operating parameter, whether the value of the operating parameter is or is not approaching the admissible range in the checking interval.

19. The method as claimed in claim 17, wherein it is ascertained whether the value of the rate of change lies inside or outside an admissible range, and a fault is inferred if the value of the rate of change lies outside the admissible range.

20. The method as claimed in claim 1,
wherein the power of the generator and/or the rotational speed of the generator is acquired and stored as an operating parameter of the generator, and/or the torque of the rotating machine is acquired and stored as an operating parameter of the rotating machine.

21. The method as claimed in claim 1,
wherein the difference between the value of the operating parameter at the later of the two directly successive checking instants at which the value of the operating parameter lies outside the admissible range and an operating-parameter reference value is ascertained, and a fault is inferred if the amount of the difference exceeds a prescribed value.

22. An apparatus adapted for executing the method as claimed in claim 1, for monitoring and operating an electricity generating installation, which comprises at least one generator that is driven by a rotating machine in order to supply electricity to an electric grid, the apparatus comprising:
a controllable valve adapted to restrict a supply of fuel to the rotating machine, and an evaluation device, wherein the evaluation device is adapted to output a control signal to the controllable valve to restrict the supply of fuel to the rotating machine to control the operation of the electricity generating installation as a result of a fault being inferred.

23. An apparatus for monitoring and controlling the operating of an electricity generating installation, which comprises at least one generator that is driven by a rotating machine in order to supply electricity to an electric grid, comprising acquisition means that are designed to acquire the value of an operating parameter of the generator and/or of the rotating machine, and an evaluation device that is designed to receive and store values of the operating parameter that are transferred by the acquisition means, and to ascertain whether the value of the operating parameter at prescribed checking instants lies inside or outside an admissible range, wherein the evaluation device is designed in such a manner that, by means thereof, a possible fault is inferred if the value of the operating parameter lies outside the admissible range at two directly successive checking instants, and it may additionally be checked whether the value of the operating parameter is approaching the admissible range in a prescribed checking interval that lies between the two directly successive checking instants, and it is inferred that there is a fault if the value of the operating parameter is not approaching the admissible range, wherein the evaluation device is adapted to output a control signal to a controllable valve to restrict a supply of fuel to the rotating machine to control the operation of the electricity generating installation as a result of the fault being inferred.

24. The method as claimed in claim 1,
wherein the prescribed checking interval extends up to the later of the two checking instants.

25. The apparatus as claimed in claim 23,
wherein the prescribed checking interval extends up to the later of the two checking instants.

* * * * *